United States Patent [19]  
Schreter

[11] 3,840,326  
[45] Oct. 8, 1974

[54] INDUSTRIAL POLLUTION CONTROL SYSTEMS AND COMPONENTS THEREOF
[75] Inventor: Robert E. Schreter, Lebanon, Pa.
[73] Assignee: Hauck Manufacturing Company, Lebanon, Pa.
[22] Filed: Dec. 13, 1972
[21] Appl. No.: 314,741

[30] Foreign Application Priority Data
Mar. 20, 1972 Great Britain.................... 13027/72

[52] U.S. Cl.................... 431/114, 181/59, 431/352
[51] Int. Cl.......................................... F23d 15/02
[58] Field of Search......... 431/114, 352; 181/33, 59

[56] References Cited
UNITED STATES PATENTS
3,229,748  1/1966  Spielman............................ 431/352
3,620,013  11/1971  Rogers et al....................... 431/114
3,720,497  3/1973  Arenson............................ 431/114

Primary Examiner—Edward G. Favors  
Attorney, Agent, or Firm—Finnegan, Henderson, Farabow & Garrett

[57] ABSTRACT
There is disclosed a closed combustion system designed to reduce the level of noise generated by its operation. The system includes an enclosed combustion chamber with ducts for supplying combustion air to the chamber and for supplying atomizing air to the fuel burner. The system is designed to be connected to an industrial furnace or kiln or rotary drier in a substantially sealed manner. The only opening to the atmosphere from the system is at the air inlet of the duct and here a noise attenuator is connected. A second noise attenuator is formed within the combustion chamber. The combination of the two attenuators and the closed construction of the system provides a reduction of the operational noise down to a tolerable level over a wide frequency band.

The combustion chamber which is disclosed combines the functions of recuperation and noise attenuation. A cylindrical grill is positioned within the chamber in alignment with the fuel burner and contains a large number of holes spaced over its cylindrical surface to accommodate the flow of combustion air into its interior. The grill is formed of a high temperature material withstand withsatand combustion temperatures. During operation, the grill transfers heat back into the incoming combustion air to preheat this air and thereby increase the efficiency of combustion. The size of the grill and the cross-sectional area of its holes are designed to have the grill function additionally as a Helmholtz chamber to absorb noise energy within the combustion chamber.

The other attenuator disclosed herein is constructed of hollow partitions spaced from one another to form a plurality of open passageways for admitting air into the combustion system. The escape of noise from the system in the opposite direction through these passageways is limited by the sound absorbing properties of the passageways. To this end, the partitions are provided with a plurality of small holes having a range of sizes to that each partition functions as a multihole Helmholtz chamber having a wider attenuation band than normal. The partitions may be filled with an acoustic absorbing material to increase the absorption of sound in the higher frequencies.

51 Claims, 12 Drawing Figures

000
INDUSTRIAL POLLUTION CONTROL SYSTEMS AND COMPONENTS THEREOF

BACKGROUND OF THE INVENTION

The present invention is directed to industrial pollution control systems, and more particularly to systems which abate or lessen noise pollution created by the operation of industrial equipment, as well as novel subsystems and components used in such systems.

Historically, it has been the generally accepted practice to use open-fired burners and combustion systems on rotary driers and kilns and on most low temperature kilns as well. The primary reason has been an economical one because air can be induced, such as by the use of a suction fan, at lower cost than by the use of a pressurized air supply for the entire combustion system. Because of the generally large size of this type of equipment and the attendant heat loss, it has been necessary to use combustion systems which operate at high combustion levels and large air flows.

During operation of such large-scale equipment, high noise levels are generated. For example, it is common to find noise levels of 125 dBA to 130 dBA within 3 or 4 feet of the burner unit. While the effct of this noise on exposed personnel has always been a concern, the recent advent of noise abatement legislation has brought the matter into even closer study. The responsibility for reducing excessive noise levels has been placed directly on the employer in most cases.

The primary purpose of this legislation is to protect employees from unhealthy sound levels under working conditions. For example, an employee might be safely exposed to a sound level of 90 dBA during an 8-hour workday; however, exposure to a sound level of 115 dBA should occur for no longer than about 1/4 hour during the same time period. In order to reduce or abate the level of industrial noise and thus safeguard the employee against the hazards of noise at the level which is considered dangerous to his health and safety, the noise abatement system of the present invention has been devised. By this novel system the noise can be reduced to a tolerable or allowable level.

The actual noise which is generated in the use of the aforementioned industrial equipment varies in frequency over a wide acoustical range. The very low frequency noise is generally a result of the response of the drum-shaped kiln or drier and associated ducts and appurtenances, which drum may be as large as 20 feet in diameter and varying in length from 20–400 feet. This low frequency noise generally ranges in frequency from a few cycles up to about 100 or 200 Hz. Medium frequency noise mostly stems from the burner flame and flame front and is generally referred to as combustion roar. This noise will vary in range from approximately 70 Hz up to about 1,000 Hz. High frequency noise can result from such causes as air flow, turboblower operation, equipment vibration, and resonance, and the frequency thereof can range anywhere from approximately 500 Hz up to 7 or 8 KHz, and even higher.

SUMMARY OF THE INVENTION

The problem of excessive noise levels caused by the operation of state-of-the-art industrial equipment of the general aforedescribed type is overcome in the present invention by a combustion system designed to abate the amount of noise which escapes into the atmosphere during operation. In accordance with the purpose of the invention, as embodied and broadly described herein, the combustion system of this invention includes a substantially enclosed combustion chamber having a burner positioned to direct its flame into the interior of the chamber. The output end of the chamber is open but is designed to mate with the entrance of the furnace or drier in a substantially sealed manner. An acoustic attenuator is mounted within said combustion chamber and constructed to exhibit sound absorbing properties for noise generated within the combustion system. This attenuator includes a shell having a substantially tubular shape and a plurality of holes spaced throughout and sized to admit noise energy into the interior of the acoustic attenuator.

The combustion chamber is of a unique construction in that it provides both heat recuperation and noise attenuation. In accordance with the purpose of the invention as embodied and broadly described herein, the combustion chamber of this invention includes an outer shell and a tubular inner shell mounted inside and spaced from the interior of the outer shell. Combustion occurs primarily within the interior of this inner shell and the high temperature of this inner shell conveys heat to the incoming combustion air to preheat the air and thereby increase the rate of reaction between the air and fuel. The inner shell is provided with a plurality of holes which are sized to form together with said outer shell a Helmholtz chamber or resonator which is tuned to absorb noise accoustical energy over a narrow frequency range.

In accordance with the purpose of the invention as embodied and broadly described herein, a second acoustic attenuator of this invention includes a plurality of spaced partitions positioned to form a plurality of spaced passageways which permit the flow of combustion air or other fluid. In order to impede the escape of noise through these open passageways, the partitions are hollow and are provided with means for absorbing noise energy in the adjacent passageways. The noise energy absorbing means includes a plurality of holes having a range of sizes formed in each partition to admit noise energy into the partition interior such that each partition functions as a Helmholtz chamber to absorb noise energy within its adjacent passageways.

The invention consists in the novel parts, constructions, arrangements, combinations and improvements shown and described. The unique features and advantages of the invention will become apparent by a reading of the following description which, taken in conjunction with the accompanying drawings, which are incorporated in and constitute a part of this specification, disclose preferred embodiments thereof.

DESCRIPTION OF THE PREFERRED EMBODIMENT

Figure 1:
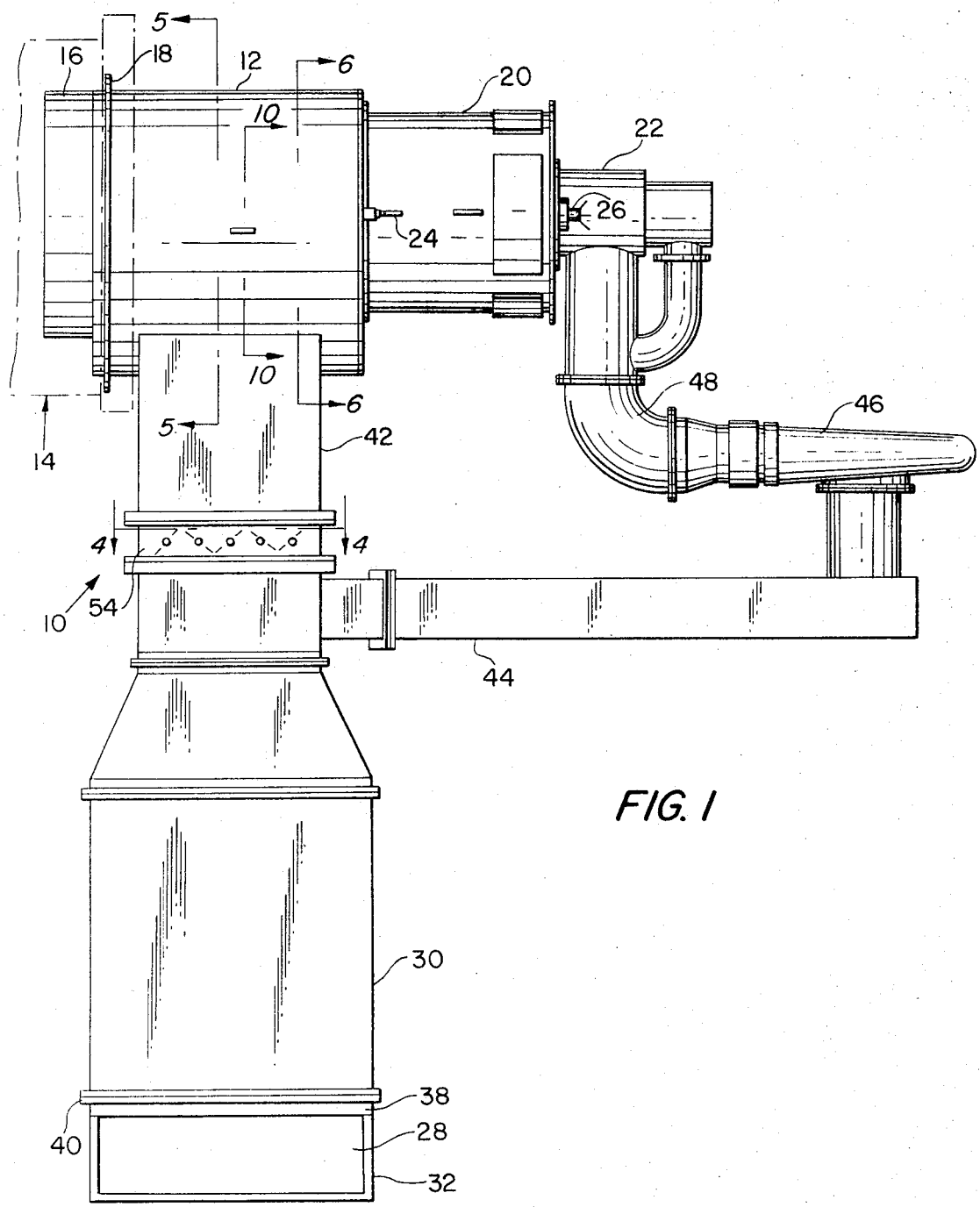
FIGS. 1 and 2 show, respectively, the plan and side elevation views of a preferred embodiment of the improved combustion system of the present invention.
Figure 2:
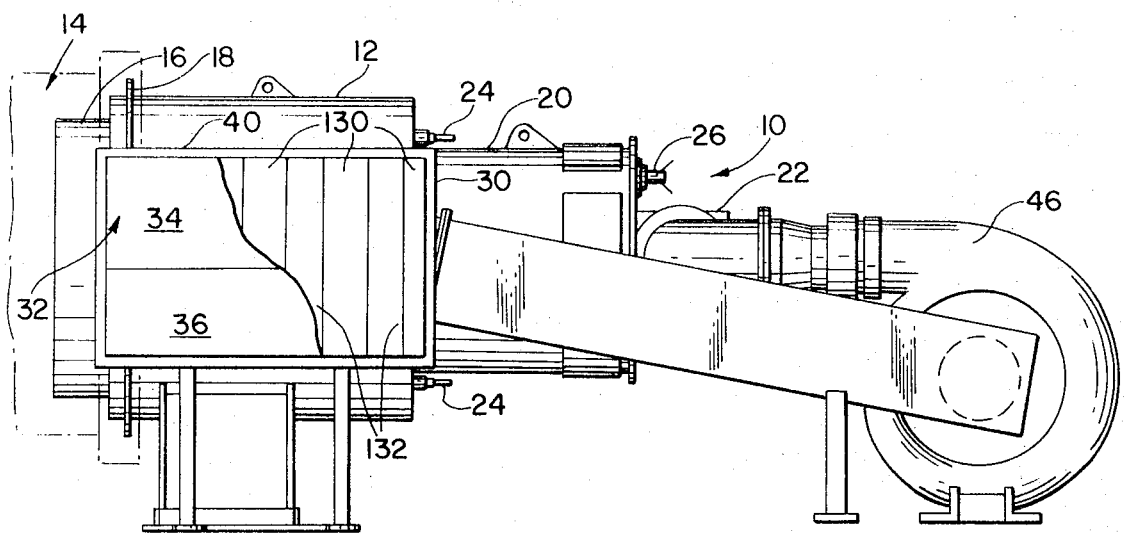

With reference to FIGS. 1 and 2, there is shown, respectively, the plan and side elevation views of a preferred embodiment of the combustion system indicated generally by arrow 10. In accordance with the invention, the system 10 includes an enclosed combustion chamber 12 having an open output end designed to be coupled with a front opening formed in an industrial drier or furnace which is represented in phantom outline and identified by the numeral 14. As embodied herein, the chamber 12 is preferably provided at its forward end with an extension 16 of reduced diameter which protrudes into the drier or furnace a fixed distance to protect the front end of such structure from the high temperature flame generated in the combustion chamber 12. As can be seen in FIG. 1, the extension 16 is shown as being offset horizontally, and the reason for this will be explained hereinafter.

An annular flange 18 is attached to the combustion chamber 12 near its forward end and is used to bolt this chamber to the front face of the drier or furnace 14. In this manner, the opening into the drier or furnace is closed off and thus prevents the escape of noise, dust, and other potential pollutants at that point. If needed, gaskets, adhesive sealants, or other conventional sealing materials can be used to obtain a seal between the combustion chamber 12 and the drier or furnace 14.

Although the present invention is designed to be used with both rotary and stationary driers and furnaces, the front end or furnace portion of the rotary structures is generally designed to be stationary. However, if it is desired to have the portion 14 of the structure shown rotate, the flange 18 will not be bolted but instead a conventional seal of the same type which is commonly employed to seal a rotating drier or kiln cylinder to the breeching or end box can be used. Examples of such seals are the wet and dry friction type, the flexible rubbing seal, and also the labyrinth seal if rubbing contact is to be avoided. Should the drier or furnace opening be found to be oversized, it can be reduced in size by conventional construction techniques to where it can be closed against the combustion chamber 12 in any of the ways set forth above. Regardless of whether the connection is between stationary or rotating structures, it is important that an effective seal be obtained to avoid escape of noise and thereby a reduction in the effectiveness of the system.

The particular type of drier or furnace to which the combustion system can be adapted forms no part of the present invention, and thus is not intended to limit the wide applicability of this invention. By way of example, this combustion system can be used with either direct driers or indirect driers, such driers being either stationary or rotary. A particularly suitable type is the rotary drier or rotary kiln which has a wide range of uses, including but not limited to those of drying, roasting, heating, and calcining. Similarly, with regard to furnaces, the combustion systems of this invention find wide utility with processing furnaces, as well as industrial furnaces, and of the direct as well as the indirect type. One of the more important types of process furnace is the rotary kiln because of its wide use in many different industries, encompassing such things as the burning of cement and lime, the dehydrating, roasting or sintering of bauxite and alumina, as well as the calcining and decomposition of materials, and the processing of stone, aggregate, and sand to be used in the manufacture of asphalt paving materials, all by way of example.

With reference again to the embodiment of FIGS. 1 and 2, the combustion chamber 12 is preferably of cylindrical shape and has at its aft end a cylindrical extension 20 of reduced diameter which will hereafter be called the sealed chamber for purposes of convenience. In accordance with the invention, a fuel burner is mounted adjacent to the combustion chamber 12 to direct its flame thereinto. As here embodied, a burner unit 22 is attached to and extends into the sealed chamber 20 at its aft endface. The burner unit 22 is of a conventional construction and houses the burner apparatus (not shown). Fuel, such as oil and/or gas, is supplied from any convenient source through fuel lines (not shown) to this burner. Chamber 20 and burner unit 22 are offset horizontally to be in line with extension 18.

As here embodied, the combustion chamber 12 further includes at least one and preferably two externally-mounted, movable rods 24 which are connected internally to an air adjusting damper, later described, to provide manual control of the flow of air within the combustion chamber to neutralize the suction pressure of the burner flame jet. Another adjustable rod 26 is mounted external of the endface of sealed chamber 20 and serves as an adjusting screw which permits lateral adjustment of an ignition tile, later described, within the combustion chamber.

In accordance with the invention, enclosed first means are provided for ducting air to the combustion chamber 12. The air ducting means has an upstream end for admitting air, and a downstream end which terminates at an opening in the combustion chamber for receiving combustion air. As embodied herein, and with reference additionally to FIG. 3, the air ducting means includes a duct system, the shape, length, and placement of which is not critical because this will be determined by the placement of the equipment, available space, design factors, and like considerations. This is readily apparent by a comparison of FIG. 1 with FIG. 3, which shows two different duct embodiments. However, in order to prevent the escape of noise, it is preferred that there be a single opening or entrance 28 at the upstream end for admitting air to the combustion system.

In the particular embodiment shown, the entrance 28 is formed as a horizontal opening in an intake hood or deflector 32 which is connected to the front of an attenuator 30, later described. Deflector 32 is formed with flat side and bottom surfaces and has a front which is formed of two plane surfaces 34 and 36. Plane 36 is positioned obliquely between vertical plane 34 and the bottom surface of deflector 32 to deflect upwardly any noise which escapes past the attenuator 30 so that it will have a reduced effect upon workers or other people nearby. Surface 34 also assists in noise abatement by acting as a reflector which reflects a portion of the noise, particularly in the lower frequencies, that escapes from attenuator 30 back through this attenuator, where it is further attenuated, and into the interior of the combustion system. A small strip 38 is formed across the back of opening 28 to help support a conventional flange 40 formed around the rear periphery of the deflector 32 for attaching it to the attenuator 30. The deflector 32 can be constructed in a conventional manner, such as for example by cutting sheet metal to size and assembling it in the desired shape.

The acoustic attenuator or silencer 30 is connected at the upstream end of the air ducting means to be in airflow communication therewith. The purpose of attenuator 30 is to prevent or minimize the escape of noise from the combustion system 10, yet freely pass in counter flow to noise flow the air necessary for combustion of fuel and whatever additional air might be needed for the process carried out in unit 14. Should it be necessary by reason of engineering design or the like that the duct system be provided with several entrances or openings, it would then be necessary to place an attenuator, such as depicted by numeral 30, at each entrance.

The rear of attenuator 30 is connected by the duct system to the remainder of the combustion system 10. To this end, a main duct assembly 42 is connected between the rear of attenuator 30 and the combustion chamber 12 to supply secondary combustion air thereto. Downstream of said attenuator 30, a second enclosed air ducting means is connected to said first air ducting means. As embodied herein, this second air ducting means comprises duct 44 of smaller cross section which branches off of duct 42 and is sealed to the intake of an air compressing means, here embodied as a turbocompressor 46. The turbocompressor 46 is a conventional device and is illustrative of many available means which can be used to supply pressurized air for a burner such as that housed in burner unit 22. In the particular embodiment shown, the compressed air is used to atomize the fuel prior to ignition. This compressed air is supplied from turbocompressor 46 to burner unit 22 through the duct 48 which is included as part of the second air ducting means.

Figure 3:
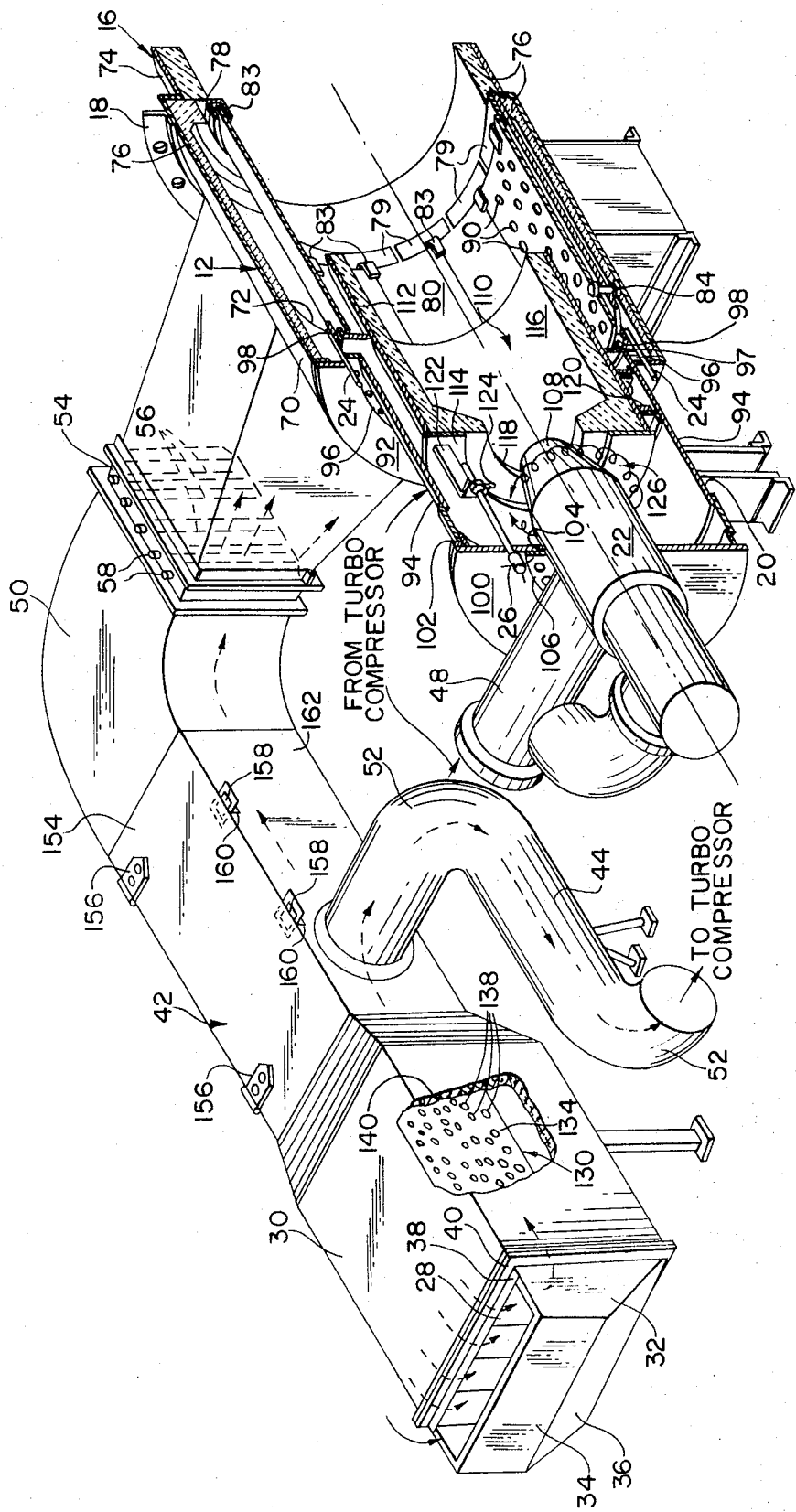
FIG. 3 shows, in perspective, a partial view of the aforesaid system in which portions are presented in cutaway form and having an alternative arrangement of the duct.

The ducts 42, 44, and 48 can be made in a conventional manner out of material such as sheet metal and includes the necessary reducing and expanding sections, elbows, flanges, etc., all of the necessary size and shape to provide an enclosed air supply system. As shown in FIG. 3, the duct 42 has been provided with an elbow 50 merely to demonstrate the alternatives to the arrangement of the ducts depending on the needs of the installation. Similarly, the duct 44 has been provided with two elbows 52 for coupling this duct to the turbocompressor 46, the latter having been omitted from FIG. 3 for ease of illustration. Where the ducting system for the turbocompressor 46 becomes lengthy, it may be advantageous to eliminate duct 44 and connect a separate attenuator 30 at the intake of this turbocompressor.

Figure 4:
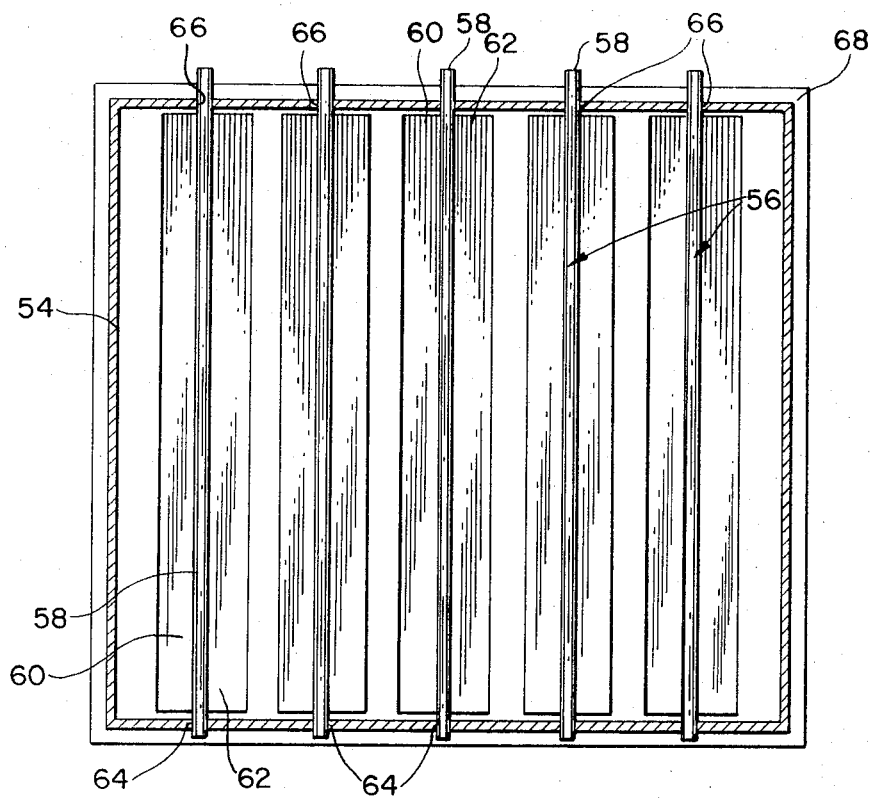
FIG. 4 shows, in cross section, a front elevation view of a damper used in the aforesaid system, taken along line 4—4 of FIG. 1.

In accordance with the invention, a damper is positioned in the first air ducting means downstream of the point of intersection of said second ducting means. As embodied herein, damper 54 is inserted in duct 42 between branch 44 and combustion chamber 12. The purpose of damper 54 is to modulate or control the flow of secondary combustion air into combustion chamber 12. Damper 54 is preferably an opposed vane damper and consists essentially of a small length of duct having mounted therein a plurality of louvers 56 which are disposed across the flowpath and are adjustable to control the cross-sectional flow area through the duct. With reference also to FIG. 4, taken along line 4—4 of FIG. 1, the louvers 56 are preferably movable from a position in which they are parallel to the flow of air, at which time the cross-sectional flow area is approximately 100 percent of the inside area of the duct, to a position where they are perpendicular to the flow of the air, at which time the duct is closed. This, therefore, gives control from zero to 100 percent of capacity over the amount of air which can flow through duct 42 into combustion chamber 12.

As embodied herein, each louver 56 is formed of a longitudinal rod 58 onto which thin blades 60 and 62 are attached, as by welding. The louvers 56 are mounted in damper 54 by positioning rods 58 in spaced aligned holes 64 and 66 formed, respectively, in the bottom and top surfaces of the damper. At the top of this damper, the rods 58 extend sufficiently far to permit them to be grasped and rotated manually either by hand or an appropriate tool. The top surface of each rod 58 can be notched or otherwise marked in alignment with its louver 56 to indicate the latter's position within the damper. Preferably, the rods are connected to some form of control means (not shown) so that they can be moved in unison to predetermined positions to obtain the desired quantity of air flow. By the use of such a control means, the air flow through damper 54 can be controlled to be in proportion to the fuel/air requirements for the burner 22. Each edge of the damper 54 has a flange 68 formed about its entire periphery for mounting the damper 54 within the duct 42.

Before proceeding to a detailed discussion of combustion chamber 22, it should now become clear that the present system to the extent it has been discussed in FIGS. 1, 2, and the portion of FIG. 3 relating to the air ducting means, is an enclosed system to abate the escape of noise therefrom, in marked contrast to the open combustion systems in common use. In systems of the latter type, it is generally the practice to have the aft end of the combustion chamber open in order to induce or entrain air past the burner unit 22, rather than receiving combustion air through a duct system as taught herein. The intake to a compressed air source, such as turbocompressor 46, is also open to the air rather than being connected to a duct such as duct 44. There is generally no concern over closing off the opening between the drier or furnace 14 and the combustion chamber 12. Obviously, there is no way to modulate the air flow as by damper 54 and no way to attenuate noise as by attenuator 30.

With reference again to FIG. 3, the construction of the preferred embodiment of the combustion chamber 12 can be described. The purpose of this chamber is to burn the fuel supplied by burner unit 22. Combustion chamber 12 is designed to be of the recuperative type where some of the heat which is generated internally preheats the secondary combustion air, and where some of this heat is also radiated internally back into the combustion zone. Both steps increase the rate of reaction between the air and fuel, and thus the completeness and thereby the efficiency of combustion.

In accordance with the invention, the combustion chamber 12 comprises an outer shell 70 and a second acoustic attenuator within the outer shell to exhibit sound absorptive properties for the noise generated within the combustion system. As herein embodied, shell 70 is a metal cylinder having a large rectangular opening 72 on the side where it attaches to duct 42. As shown, the inner surface of shell 70 is lined with a layer of insulation 76. Under certain conditions, the use of a recuperative combustion chamber can permit shell 70 to remain unlined because the temperature level at the inside surface of shell 70 is normally in the region of 300°–400° F. This is in marked contrast to temperatures in excess of 2,000° F to which conventional ignition or combustion chambers are normally exposed. This latter temperature level requires that the combustion chamber have a refractory lining. The refractories which are used cannot generally withstand the thermal shock caused by sudden changes in temperature resulting from intermittent operation of the combustion system. Often such chambers will fail because the sudden expansion of the refractory surface ultimately results in thermal spalling. Therefore, by designing a combustion chamber free of refractory lining, the thermal spalling problem is averted.

In some cases, however, it may be found desirable to attach a layer of insulation 76 along the inner cylinder surface of shell 70, as shown. The opening 72 will, of course, extend through this insulation. Insulation 76 aids in the reduction of heat loss and better recuperation of heat between the interior of the combustion chamber 12 and the incoming secondary air stream. It should be realized, however, that the insulation 76 is a low temperature insulation in contrast to the high temperature insulation or refractory material presently used in combustion chambers. As such, insulation 76 can be selected so that it is free of such problems as thermal spalling.

As embodied herein, extension 16 of combustion chamber 12 is formed as a cylindrical metal shell 74 of reduced diameter attached to the forward end of shell 70. Insulation 76, which is also applied to the inner surface of shell 74 is made thicker because of its exposure to the combustion flame. Preferably, here, the insulation is a high temperature insulation and thus a different material from that used to line shell 70. The forward end of shell 74 is open and serves as the output end of the combustion chamber 12.

Figure 5:
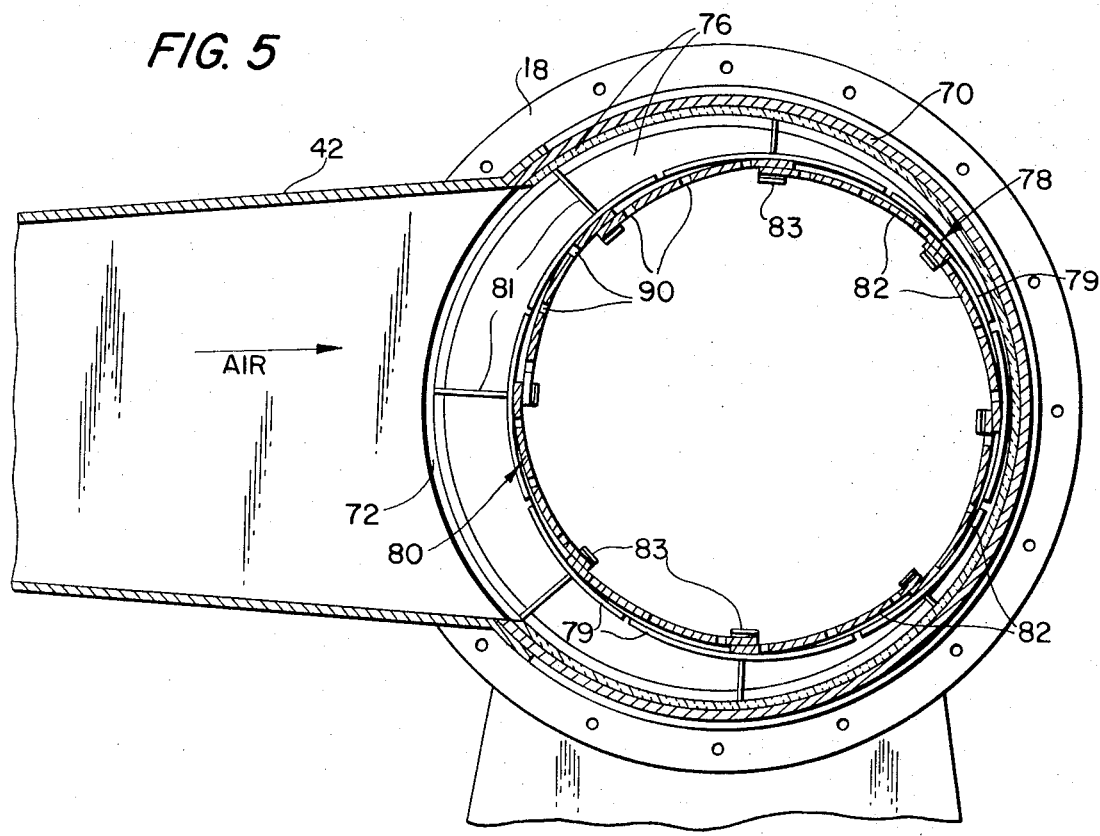
FIGS. 5 and 6 show, in cross section, elevation views of an improved combustion chamber taken along lines 5—5 and 6—6 of FIG. 1.

With reference also to the cross-sectional view of FIG. 5, at the front end of combustion chamber 12 there is mounted a circular metal band 78 aligned substantially flush with the opening in shell 74. Band 78 is preferably not continuous but is formed of a plurality of curved sectors 79 to allow for thermal expansion. Each sector is mounted on one or more struts 81 which extend upward from shell 70 through insulation 76. This metal band serves as a support for the forward end of a combustion chamber grill 80 which rests loosely within this band and is retained there by a plurality of L-shaped clips 83 formed on sectors 82.

Figure 6:
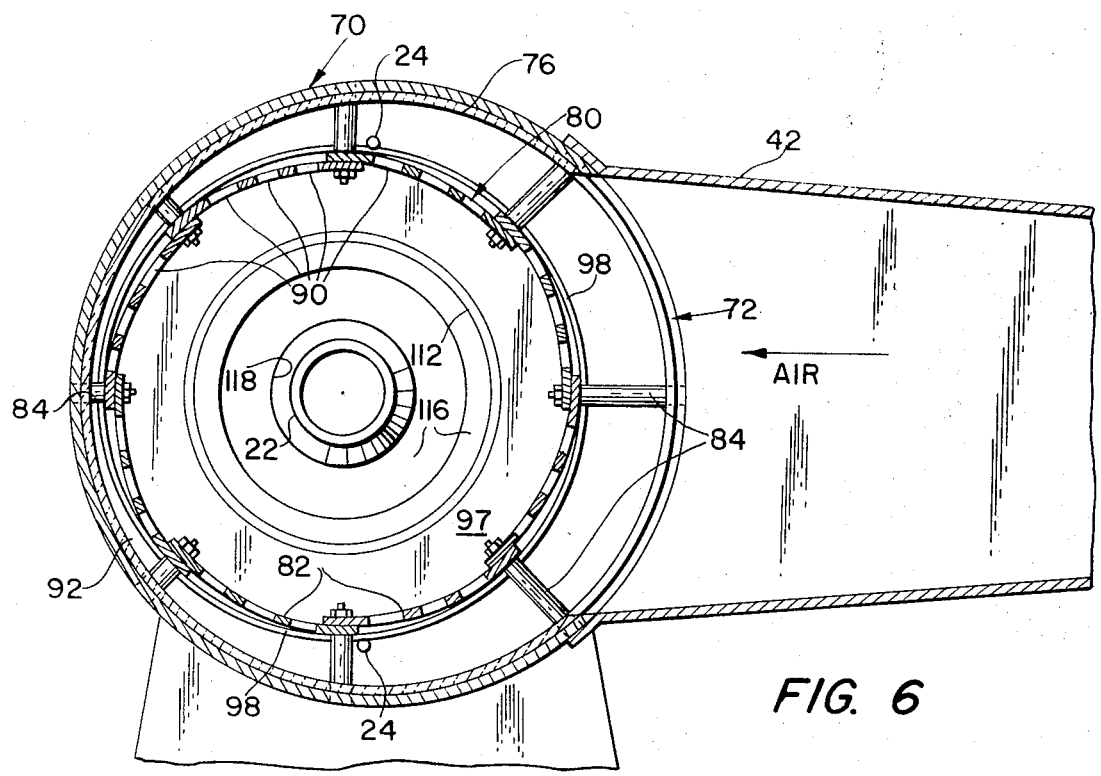

With additional reference to the cross-sectional view of FIG. 6, grill 80 is, in accordance with the invention, of a substantially tubular shape and is supported within but spaced from the interior of the combustion chamber shell 70. As herein embodied, grill 80 is made of a high-temperature material, such as a metal which resists the high temperature of combustion, and is articulated in construction in that it is made from a number of arcuate, longitudinal overlapping sections 82. Each section 82 has two lengthwise edges and the grill is formed such that an edge of each section overlaps the edge of an adjacent section as shown to provide for thermal expansion.

Grill 80 extends substantially the entire length of cylindrical shell 70 and the spacing between grill 80 and insulation 76 permits the free flow of secondary combustion air over its external cylindrical surface. There are means provided for mounting the grill 80 within shell 70 and these means are herein embodied as a plurality of bolts 84 which are circularly arranged and attached to the interior of shell 70 toward its aft end. Each bolt 84 extends through the overlapped edges of two grill sections 82 and is retained there by a nut. The holes in the sections 82 which receive the bolts are oversized to permit thermal expansion.

The bolts 84 are made longer on the side of shell 70 where duct 42 attaches and progressively decrease in length toward the opposite side. The result of this arrangement is that the grill 80 is offset or eccentrically mounted with respect to the longitudinal axis of the cylindrical shell 70 and thus provides greater space at opening 72, as compared with the space around the remainder of the grill, for the intake and distribution of the large volume of secondary combustion air which must be handled under maximum operational conditions. The secondary air, it should be noted, is prevented from escaping forwardly past the exterior surface of grill 80 because the insulation 76 is thickened annularly where metal band 78 is mounted and thus blocks forward air flow. The secondary air therefore either flows into grill 80 or back toward burner unit 22, as hereafter described.

Figure 10:
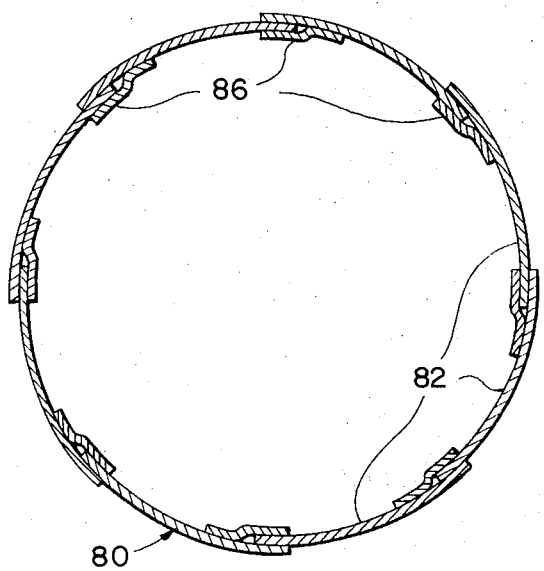
FIG. 10 is a partial elevation view, in section, showing the grill used in the combustion chamber, taken along line 10—10 of FIG. 1.

Between band 78 and bolts 84, the grill 80 is preferably unsupported, but the sections 82 are maintained in a substantially cylindrical shape by spaced retention means. As embodied herein and shown in FIG. 10, which is a partial elevation view, in section, of the grill 80, these means include a clip 86 attached to one edge of each grill section 82. Preferably, each clip 86 is attached to the inside of the overlapping edge of each section 82 to form a space therebetween for receiving the lapped edge of the adjacent section. This space has a sufficient depth to accommodate thermal expansion of the grill sections 82. Clips 86 are preferably made of stainless steel or a like metal and are spaced at one or more points along the length of the grill, as desired.

In accordance with the invention, a plurality of small diameter holes, identified by numeral 90, are formed throughout the grill 80. As herein embodied, holes 90 are formed in each of the sections 82 comprising cylindrical grill 80. One purpose of these holes is to admit the secondary combustion air supplied by duct 42 into the interior of the grill where combustion occurs. This combustion air flows over the cylindrical surface of grill 80 and into its interior through holes 90. The holes 90 are preferably uniformly placed over the cylindrical surface of the grill, and are of uniform size. It is also preferred that the rate of air flow through the holes 90 in the grill be substantially uniform. As here embodied, the aforedescribed eccentric mounting of the grill 80 assists in attaining this end. The progressive reduction in the annular spacing between the grill 80 and shell results in a constant velocity pressure and thereby the maintenance of a constant and uniform air flow rate through the grill holes 90.

Figure 11:
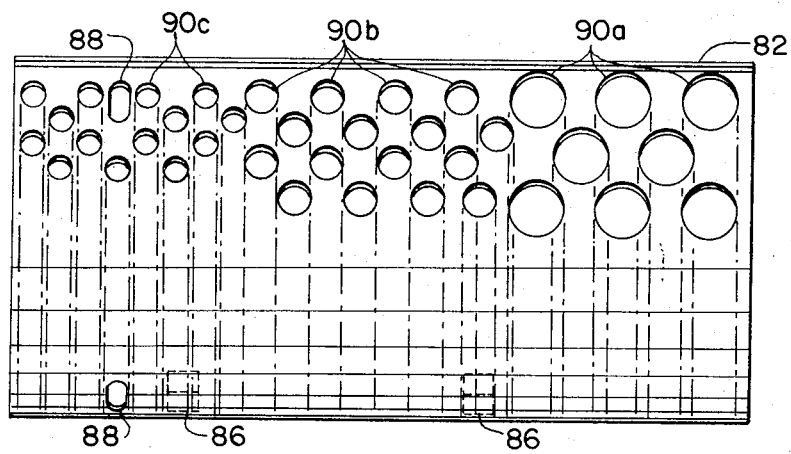
FIG. 11 is a top plan view of an alternative construction of a grill section.

In FIG. 11, an alternative preferred embodiment of the hole sizing and placement in grill 80 is shown. Here, a top plan view of a grill section 82 is depicted whose holes consist of three distinct sizes. Holes of the same size are grouped in three bands across the width of the section 82, resulting in three cylindrical bands disposed along the length of the grill, when assembled. The sizes of holes 90a, 90b, and 90c have been purposely exaggerated to emphasize their difference in size.

The grill temperature is greatest at its forward end during combustion and with certain grill materials, additional cooling becomes necessary in order to protect the grill. The largest holes 90a are placed in the front of section 82, the medium-sized holes 90b in the middle band and the smallest holes 90c in the rear. A greater flow of secondary combustion air flows through holes 90a, a lesser amount through holes 90b, and the least of all through holes 90c. During operation, the larger air flow at the front of the grill improves temperature reduction. The numerals 86 point to the clips, previously discussed, formed on the inner face of the section 82 for receiving the edge of an adjacent section during assembly of the grill. Holes 88 are for receiving bolts 84 during placement of the grill in the combustion chamber and are oversized to permit thermal expansion of the section 82.

The combustion chamber 12 has an annular plate 92 which is attached to the aft end of cylindrical shell 70 by a weld or other suitable means. The opening of plate 92 is eccentric and sized to mate with the sealed chamber 20 so that this chamber is aligned with grill 80. Chamber 20, as shown, is formed as a cylindrical metal shell 94 having an annular flange 96 which is connected to plate 92 by bolts, welding, or the like, to seal the combustion chamber at this junction.

Figure 12:
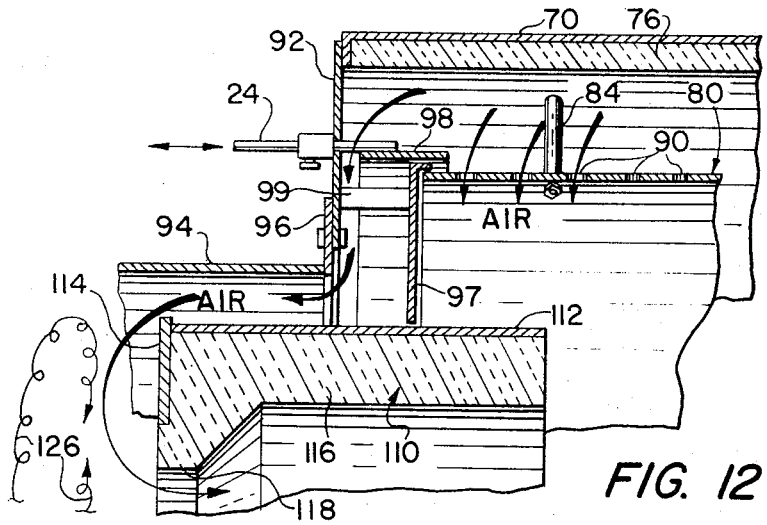
FIG. 12 is an enlarged partial elevation view of the cutaway combustion chamber shown in FIG. 3.

The grill 80 terminates short of plate 92 so that a path is provided for the flow of secondary combustion air around the aft end of grill 80 into the interior of chamber 20, thus bypassing grill 80. In accordance with the invention, the combustion chamber comprises a damper position therein to control the flow of combustion air. As best illustrated in FIG. 12, a metal band 98 is positioned adjacent to the aft end of grill 80 but is not rigidly attached thereto. Band 98, which serves as an annular damper, is adjustable longitudinally over the aft end of the grill 80 and thereby controls the size of the annular opening at the rear of chamber 12 leading to chamber 20. Adjustment of the damper and thereby control of air flow is made possible by the provision of two movable rods 24, previously described, which are attached to band 98 and which extend outside of the combustion chamber through holes appropriately formed in plate 92. The positioning of these rods 24 will determine the percentage breakdown of air flow between these chambers. This damper affords an adjustment of the pressure relationship between the interior of grill 80 and the sealed chamber 20 to eliminate suction within this latter chamber which results in pressure oscillations during combustion, as more fully described hereinafter. The rear of grill 80 is closed by an annular air retaining plate 97. This plate 97 is preferalby not attached to grill 80 but is mounted inside of the combustion chamber by a plurality of struts 99 welded to the inside of plate 92.

The aft end face of chamber 20 is closed by plate 100 which is attached to annular flange 102 by welding, bolting, or other convenient means. A hole 104 is formed in plate 100 and is sized to receive the forward portion of burner unit 22. The positioning of burner unit 22 is accomplished by an annular flange 106 formed on its periphery which permits the burner unit to be attached to plate 100 by bolts or other convenient means.

Because burner 22 is an enclosed unit, it can be seen from the foregoing description that the combustion chamber 12 including its sealed chamber extension 20 are a fully enclosed or sealed unit which minimizes or abates the escape of noise therefrom. The only openings are those that are designed, namely, opening 72 which is connected to duct 42, and the discharge opening at extension 16, although there is provision for sealing the combustion chamber to the front end of the drier or furnace unit 14, as earlier described.

The front end 108 of burner 22 is positioned adjacent the rear of a conventional ignition tile 110 which assists in the ignition and burning of the fuel in a well-known manner. Ignition tile 110 is of a sufficient length to extend forwardly into cylindrical shell 70 where it opens into the interior of grill 80. Tile 110 is of a generally cup-shaped design formed of an outer cylindrical metal shell 112 and bottom metal plate 114, both of which can be constructed from stainless steel or other suitable material. It is to be understood, however, that the tile 110 can be formed in other shapes. The interior of this metal cup is lined with a thick layer of tile 116 made from any suitable high-temperature refractory material. The bottom of tile 110 has a large hole or opening 118 aligned with the forward end 108 of burner unit 22. Ignition tile 110 rests on support or saddle 120 attached to the bottom of chamber 20.

Ignition tile 110 is movable along its longitudinal axis so that its position with respect to the burner nozzle (not shown) at end 108 of the burner unit 22 can be adjusted. The reason for this adjustment is to permit control over the stability and shape of the flame. Adjustment is effected through the provision of an L-shaped bracket 122 attached to plate 114 and tile adjusting screw 26. A threaded member, such as nut 124, is positioned in the base of the L-shaped bracket to receive the threaded shank of screw 26. By clockwise or counterclockwise rotation of the screw 26, tile 110 can be caused to move rearwardly or forwardly, as desired.

To simplify the drawings, no attempt has been made to portray the conventional apparatus associated with a burner unit, such as depicted at 22. This would include, without limitation, such apparatus as a pilot, fuel input ports, throttles, gages, valves, and all associated plumbing. It is to be understood, of course, that any access required into the interior of the burner unit 22 or chamber 20 would be made through an opening properly sealed to avoid the escape of noise.

In operation of the combustion system 10, it is to be assumed that the drier or furnace 14 to which the system is attached includes a suction fan (not shown) at its discharge end to draw in, via the air ducting means, the secondary air required for combustion. If such fan is not available, than an impeller, compressor or similar device (not shown) can be installed in the air ducting means to create a pressurized, forced-air system and thereby meet the air flow requirements of combustion. By whatever means are employed, air is drawn in through entrance 28, passes through attenuator 30, main duct 42, damper 54, and into combustion chamber 12 via opening 72. The louvers 56 of damper 54 are positioned to control the secondary air flow in porportion to the fuel/air requirements of the burner 22. At this time the turbocompressor 46 is started, and air is drawn out of duct 42 through duct 44 and into the turbocompressor 46 intake where it is compressed. A supply of compressed air is provided to burner unit 22 by duct 48. Fuel is also supplied to the burner 22 at this time by conventional means (not shown) where it is atomized by the compressed air and sprayed as a fuel/air mixture out of the burner unit 22.

The spray of atomized fuel is ignited by conventional ignition means (not shown), such as a high energy electrical discharge or spark or gas pilot, and a flame issues forth out of the burner unit 22 into ignition tile 110. If adjustment of the tile 110 is necessary, this can be accomplished by the proper rotation of tile adjusting screw 26 so that the desired flame stability and shape are attained.

The secondary air which enters the combustion chamber via opening 72 follows essentially two paths. The first path is about the outer surface of grill 80 and into its interior via the plurality of holes 90. The other path is past the annular opening controlled by damper 98, along the outer shell 112 of ignition tile 110 and into hole 118 where it is diffused with the atomized fuel jet. A flame front progresses out of the interior of ignition tile 110 into grill 80 of combustion chamber 12 where combustion principally occurs and is essentially completed. Heat is now transferred from the chamber 12 into the unit 14 by flow of the hot combustion gases generated in chamber 12 as well as by radiation from the flame itself and the heated exposed components of the combustion chamber 12 and its extension 16.

As explained earlier, the combustion chamber is recuperative in its operation. Grill 80 is elevated to a relatively high temperature within the temperature limits of the material used, and transfers heat to the inflow of secondary combustion air by radiation and conduction. This air by such preheating causes an increase in the rate of combustion reaction between the air and fuel. Also, the high temperature of grill 80 radiates heat back into the combustion zone in front of ignition tile 110 and further increases the air/fuel reaction rate. The result is that a more complete combustion of fuel occurs in chamber 12 and this increase in fuel combustion efficiency results in a more economical operation.

Where insulation, such as shown at 76, is used to line the inside of shell 70, it aids in reducing the loss of heat through the wall of combustion chamber 12 and will also result in better recuperation of heat in relation to the incoming secondary air flow.

It is important during operation to maintain a reasonably constant pressure between the combustion zone (interior of grill 80) and the generally annular zone 126 surrounding and adjacent to the front end 108 of burner unit 22. This balance can be attained by means of the earlier-discussed adjustable damper 98 (FIGS. 3 and 12) which controls the flow of secondary combustion air into chamber 20 and to zone 126. If this control is not provided, the entrainment of secondary combustion air by the high velocity burner jet can create a suction effect which lowers the pressure in zone 126 until a sufficient pressure differential is reached where air flows from the combustion zone back toward zone 126. The pressure within the zones equalizes and the flow is again forward. However, an imbalance soon recurs accompanied by another backflow. Thus, the pressure oscillations cause flow oscillations which result in fuel being brought back into zone 126 where it will burn and damage or destroy the equipment. In the case where a liquid fuel is used, fuel droplets would be sprayed in all directions and some would impinge on the exposed surfaces of the equipment. Because of the high temperature, low boiling components of the fuel would volatize, leaving sticky hydrocarbon deposits adhering to these surfaces, and the operation of the system would be seriously impaired. Where possible, it is preferred that the components be positioned within the combustion chamber 12 and the chamber 20 so that no pressure differential occurs; however, the addition of the adjustable damper 98 affords a means to vent the desired amount of air to zone 126 and thus neutralize any suction pressure imbalance. It is preferable, although not essential, that the total air flow into grill 80 and to zone 126 combined remain constant regardless of the position of band 98. One way to accomplish this is to have the band arranged progressively to close off holes 90 as it is moved forward from plate 92. Thus, as less air flows into grill 80, more flows through the annular space between band 98 and plate 92, but the total flow remains constant.

As discussed earlier, there is a tremendous amount of noise generated by the operation of these combustion systems and the equipment which utilizes the generated heat. It is quite common to find noise levels of 125 dBA or higher. As pointed out, overexposure to these noise levels can be severely harmful to the personnel who must work near this equipment and can lead to hearing loss, heart problems, and be the cause of high blood pressure and eardrum damage, just to name a few examples.

When the combustion system 10 is enclosed and the connection between the system 10 and the unit 14 is sealed, as has just been described, essentially all of the noise which is generated is confined within the combustion system. For practical purposes, it can be assumed that the noise which is so confined does not diminish and absent some way to attenuate or absorb it, it will escape from the system. For example, the noise within chamber 12 attempts to escape by propagation into duct 42 from the chamber, as well as by the path through burner unit 22, turbocompressor 46, and duct 44, and this collected noise, including the noise generated by the turbocompressor itself, will attempt to pass out entrance 28.

As previously described, the noise emanating from the combustion system 10 can be broken down into three general frequency ranges: low, medium, and high. It has been found that low frequency noise is the most difficult to attenuate. In accordance with the invention, a Helmholtz chamber has been incorporated into the combustion chamber 12 to absorb or selectively attenuate the noise in the low frequency range and up into the medium frequency range also.

A Helmholtz chamber is an acoustic resonator which is generally tuned over a narrow range of frequencies about a resonant frequency and can be used as an absorber of acoustical energy. As herein embodied, and with reference again to FIGS. 3, 5, and 6, and the grill 80 and the shell 70 generally define the Helmholtz chamber, and the holes 90 are the openings which admit acoustical energy into the interior of the chamber. The range of hole sizes available for selection is restricted somewhat by the need to insure sufficient secondary air flow into grill 80. Preferably, the area or size of the holes 90 is selected so that energy is absorbed in the low frequency range. Because, in this embodiment, the holes are also made a uniform size for the aforedescribed purpose of having a uniform flow rate, energy is absorbed in a narrow range of low frequencies about the resonant frequency of the Helmholtz chamber.

It has been found that the level of low frequency noise can be reduced from between 5 to 15 dB. This reduction tends to bring the low frequency component of the overall noise down to a more tolerable level so that the adverse effect of longterm exposure is reduced. Furthermore, should any low frequency noise which is not absorbed escape from the combustion system through attenuator 30, the use of a reflector, such as shown at 32, will reflect a portion of the noise back into the system and will direct the remainder of this noise upwardly or in the direction most favorable for the particular installation involved.

In the alternative grill embodiment of FIG. 11, three distinct hole sizes are shown as holes 90a, 90b, and 90c. The range of frequencies which are attenuated by having holes varied in size is widened over that of the previous embodiment where all holes are of the same size. It is also within the scope of this invention to vary the size of the grill holes across the entire surface of the grill 80. In such case, the holes 90 shown in the FIG. 3 embodiment would not be made of uniform size throughout, but instead would vary in size in accordance with the range of frequencies which it is desired to attenuate. It has been found that the system can readily accommodate hole sizes in grill 80 which vary an order of magnitude between the smallest and largest holes and still satisfy uniform flow rate requirements. Within such design constraints of uniform flow, where the size of the holes 90 is reduced, the holes must be increased in number, and where the hole size is enlarged, the number of holes must be decreased. In this manner the total cross-sectional hole area remains substantially the same as in the uniform-hole-size embodiment. In view of the above teaching, it should be realized that in the FIG. 11 embodiment, the holes in each band of sections 82 can also be varied in size yet still satisfy the uniform flow rate requirement for each of the bands of the completed grill. A wider range of frequencies is thus attenuated by each band of the completed grill as compared to where each band contains holes of a uniform size.

The other acoustic attenuator embodied herein in attenuator 30, which was described earlier. In FIG. 2, the deflector 32 has been partially cut away to show the front of this attenuator. In accordance with the invention, there is at least one passageway formed in the attenuator for the flow of combustion air therethrough. As herein embodied, a plurality of partitions 130 are mounted within the acoustic attenuator housing 30 to define a plurality of passageways for the flow of combustion air therethrough. Preferably, the partitions 130 are spaced vertically between the top and bottom opposed surfaces of attenuator housing 30 to form a plurality of open passageways 132 for admitting air into the interior of combustion system 10. By additional reference to FIG. 7, which is a rear view of attenuator 30, and FIG. 8, which is a plan view of the attenuator with the top surface removed, a better understanding of the construction and operation can be obtained. Each of the interior partitions 130 is hollow and is made from a pair of spaced metal sheets 134 forming opposed sidewalls which are substantially parallel throughout their length but which are bent and joined at the rear by riveting, welding, or the like, to form a tapered trailing edge. The front of each of these partitions 130 has a nose fairing 136 which also extends between the top and bottom surfaces of the attenuator housing 30. Fairing 136 is formed of a metal sheet curved through 180°. Each nose fairing 136 is joined to its two sheets 134 by riveting, welding, or the like.

The two end partitions 130 are also hollow and are essentially half the size of the interior partitions and are connected at the nose fairings and trailing edges to an opposite one of opposed surfaces forming sidewalls of the attenuator housing. Each consists of a single sheet of metal 134 which serves as the partition sidewall and a nose fairing 136 of approximately 90° curvature in contrast with the 180° curvature of the nose fairings of the interior partitions. Each nose fairing 136 of an end partition has a flange to aid in attaching it to the sidewall of attenuator 30. The rear of these end partitions are also tapered by bending metal sheets 134. All partitions 130 are conveniently formed with top and bottom flanges to assist in the mounting of these partitions to the top and bottom surfaces of the attenuator 30.

Preferably, the passageways 132, as formed, are streamlined to assist in the flow of air therethrough. The nose fairings 136 act to reduce the pressure drop of air drawn through the inlet, and the nozzle-like discharge created by the tapered trailing edges of partitions 134 provide a smooth expansion of the flowing air to reduce turbulence and pressure drop.

It should be clear from the foregoing description that the combustion system 10 is from an airflow standpoint in open communication with the exterior air by virtue of the passageways 132 of attenuator 30. Furthermore, these passageways 132 must be of sufficient size to accommodate the air flow demands of the combustion system; yet at the same time, there must be means for absorbing sound positioned adjacent these passageways to attenuate or impede the flow of sound, i.e., noise energy, therethrough in a direction opposite to that of the airflow so that any noise which does pass through is reduced in level.

Figure 7:
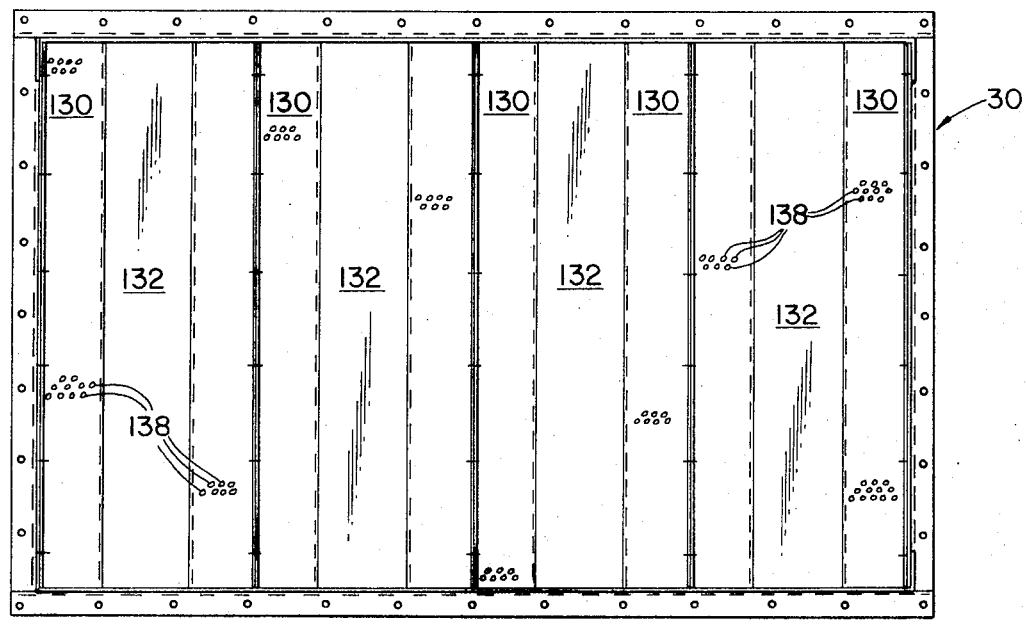
FIG. 7 is a rear elevation view of an improved attenuator which can be used in the aforesaid system.
Figure 8:
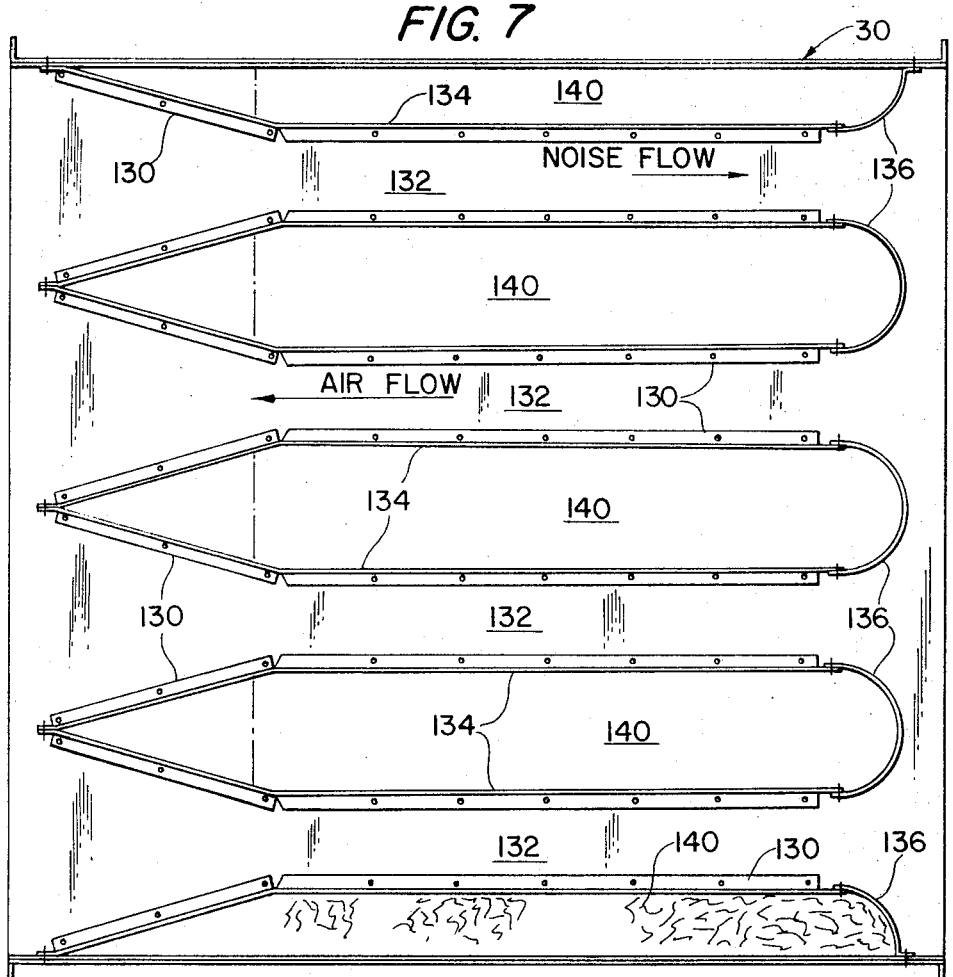
FIG. 8 is a plan view of the aforesaid attenuator with the top surface removed therefrom to show its interior construction.

As herein embodied, each partition has at least one surface adjacent one of the passageways and the sound absorbing means includes a plurality of holes formed in each of the surfaces. Preferably, each vertical sheet 134 is constructed with a plurality of holes 138, as depicted in FIGS. 3 and 7, throughout its length and height. Each of the partitions 130, therefore, acts as a multihole Helmholtz resonator, similar to that described previously in regard to combustion grill 80, and the holes 138 admit noise energy into the interior of their associated partitions. The holes 138 are preferably varied in size resulting in each Helmholtz resonator being tuned to absorb noise through a reasonably wide frequency range in the medium frequencies of about 200 Hz up to approximately 800 or 1,000 Hz. The exact tuning of the resonators will depend upon the hole diameters, thickness of the sheet 134, and the volume within the enclosed partitions 130. The selection of hole size is not constrained by air flow requirements as in grill 80, and the range of frequencies which can be attenuated is accordingly greater.

As embodied herein, the sound absorbing means further comprises a sound absorbing material 140 substantially filling each of the enclosed partitions 130. Preferably, each is filled with an acoustic absorption material 140 which is designed to absorb sound above the 800 to 1,000 Hz level. Examples of the materials which can be used are fiber glass, mineral wool, or other fibrous substances, without limitation, all of which are of a well-known construction and commonly used as sound absorbing materials.

Attenuator 30 is therefore preferably sized and constructed to provide effective attenuation of noise in the medium and high frequencies. In operation, as the noise propagates through ducts 42 and 44 and attempts to pass through attenuator 30, it reverberates in passageways 132 and a portion of the noise energy passes through holes 138 in the adjacent sheets or sidewalls 134. The characteristics of the Helmholtz resonators absorb energy in the medium frequencies and the acoustic absorption material 140 absorbs noise energy in the high frequencies beginning at about 800 Hz. While the attenuator 30 does not eliminate all medium and high frequency noise, it has been found that a substantial reduction in noise level by about 20 to 30 dB can be attained, which is sufficient to bring the medium and high frequency noise down to a tolerable level.

Figure 9:
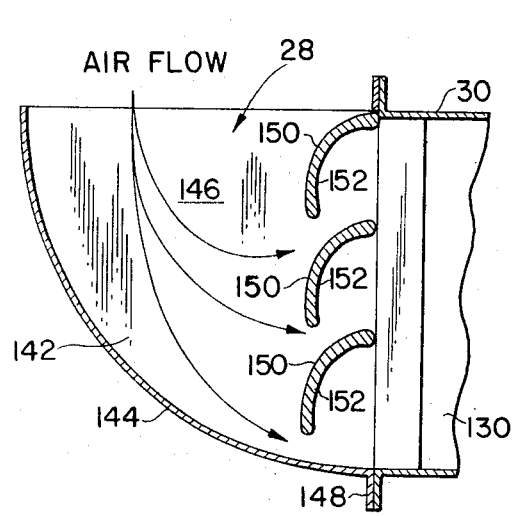
FIG. 9 is a side elevation view, in cross section, of an alternative embodiment of the deflector used in the aforesaid system.

FIG. 9 is a cross-sectional view in elevation of an alternative embodiment of the intake hood deflector 32 shown in FIG. 1. Defector 142 has a curved front surface 144 and opposed flat sizes 146, one of which is shown in this sectional view. The top of deflector 142 is open to form the entrance 28 for admitting air into the combustion system. A conventional flange 148 is formed on the rear periphery of defelctor 142 for attaching it to the flange of attenuator 30.

Positioned horizontally across the deflector 142 adjacent its rear portion is a plurality of curved vanes 150. The ends of these vanes are connected to the sides 146 of the deflector so that they span the width of the deflector. The vanes 150 are positioned such that their concave inner surfaces 152 face the downstream end of the air ducting means from a flow standpoint, and thereby the inlet of attenuator 30.

In operation, combustion air is admitted through entrance 28 and flows around vanes 150 into attenuator 30 and then on to the rest of the combustion system, in the manner previously described. Noise, particularly in the low frequency range, which passes in counter flow through attenuator 30 without being absorbed, will attempt to escape via deflector 142. However, the vanes 150, by virtue of covering the major part of the inlet flow path of attenuator 30, act as reflectors to reflect a substantial portion of this long wavelength energy from their inner surfaces 152 back into the system where its level is further reduced. This arrangement has been found to have considerable effect in reduction of noise in the low frequency range. Noise which does escape past the vanes 152 is preferably deflected away from the operating personnel, here shown as being in the upward direction by deflection by front surface 144.

The combustion system has been described as being sealed to reduce the level of noise generated during operation. This construction also serves to minimize and preferably eliminate the escape of other potential pollutants such as dust, smoke, combustion gases, and the like, to the atmosphere via the combustion system. This concern over the reduction of pollution is not solely associated with combustion systems but carries over to other parts of industrial driers and furnaces with which combustion systems are used. Most designs being used to reduce or eliminate the escape of pollutants include sealing off the remainder of these driers or furnaces, except for exhaust stacks and chimneys where other techniques for reducing pollution are employed. One adverse result of virtually sealing off these driers and furnaces is that the likelihood of explosions is enhanced. If an explosive atmosphere is created within the drier or furnace, a spark or flame can cause ignition and a resulting explosion, destroying or severely damaging the equipment.

In accordance with the present invention, there is provided means for relieving the pressure generated by an explosion. As embodied herein, said relieving means includes a movable wall in duct 42 which is opened in response to the build-up of such pressure in the drier or furnace in order to vent the explosion gases and thereby reduce the pressure. Preferably, duct 42 has one panel 154 hinged at 156, as shown in FIG. 3, so that it will swing open under such excess pressures. Normally, panel 154 is kept in the closed position shown by a magnetic closure comprising several magnets 158 mounted at spaced intervals along the edge of panel 154 and corresponding metal holding plates 160 mounted at the top edge of side panel 162. If necessary, a gasket (not shown) or similar sealing material can be placed around the entire edge of panel 154 to insure a seal between this panel and the adjacent duct panels. While only one section of duct 42 has been shown here with an explosive venting construction, it should be understood that other sections of duct 42 and the other ducts in the system can be similarly constructed.

As mentioned previously, the recuperative operation of combustion chamber 12 leads to an increase in efficiency and thereby a substantial savings in fuel consumption. Additional savings by virtue of a reduced operating cost is realizable by the provision of damper 54 which serves to modulate the secondary combustion air. During turndown operation, absent the damper, the exhaust fan in the drier or furnace 14 will draw the same volume of air through the system. Being able to modulate the flow of secondary combustion air, the volume of air which is moved by the exhaust fan can be reduced. This results in a lower operational cost from two standpoints. First, the reduction of secondary air flow means that there will be a considerably lower amount of air passing through the drier or furnace and carrying off valuable heat. Secondly, the horsepower at the fan required to draw this reduced volume of air is obviously less than the horsepower required to draw the full volume of air absent modulation and significant savings can therefore be recognized by the reduction in electrical power consumption. Although damper 54 is not essential to the combustion system or its noise abatement properties, its incorporation can lead to increased operating efficiency.

While the invention has been particularly shown and described with reference to a preferred embodiment thereof, it will be understood by those skilled in the art that various changes in form and details may be made therein without departing from the spirit or scope of the invention.

What is claimed is:

1. A combustion system for use with furnaces, driers, and like equipment, said system being designed to abate the escape of noise therefrom, and comprising:
   A. an enclosed combustion chamber having
      1. an open output end designed to be coupled to the aforesaid equipment;
      2. a generally cylindrical outer shell,
      3. an opening through said outer shell for admitting combustion air thereto, and
      4. a substantially tubular inner shell mounted within and spaced from said outer shell, said inner shell having a plurality of holes spaced about the periphery thereof and along the length thereof, each of said holes having a selected diameter to form together with said outer shell a Helmholtz resonator for absorbing acoustical energy within a selected frequency range and to enable said combustion air to enter said inner shell,
   B. a fuel burner mounted adjacent to said combustion chamber and adapted to direct its flame into said inner shell in order that combustion principally occurs within said inner shell.

2. A combustion system as claimed in claim 1 wherein said inner shell is made of a high temperature material which resists the high temperatures of combustion and wherein said inner shell effects preheating of said combustion air prior to the entry of said combustion air into said inner shell and increases the combustion rate of the fuel.

3. A combustion system as claimed in claim 2, wherein said combustion chamber further comprises:
   A. a damper positioned within said combustion chamber between said opening and said fuel burner to control the flow of combustion air within said combustion chamber.

4. A combustion system as claimed in claim 3, wherein said damper is
   A. positioned adjacent to the aft end of the inner shell to control the amount of air which flows around the aft end of the grill to said fuel burner.

5. A combustion system as claimed in claim 4, wherein:
   A. said damper is adjustable, and said combustion chamber further comprises:
   B. at least one movable rod attached to said damper, said rod extending outside of said combustion chamber to permit adjustment of the damper.

6. A combustion system as claimed in claim 5, wherein said damper comprises:
   A. an annular metal band positioned to be adjusted over the aft end of the inner shell to control the size of the annular opening at the rear of said combustion chamber.

7. A combustion chamber as claimed in claim 1, wherein:
   A. said holes are of uniform size throughout the inner shell.

8. A combustion chamber as claimed in claim 1, wherein:
   A. said holes vary in size.

9. A combustion chamber as claimed in claim 8, wherein:
   A. said holes are grouped into a plurality of cylindrical bands on said inner shell.
   B. the size of the holes in each band being different from the size of the holes in the remaining bands.

10. A combustion system for use with furnaces, driers, and like equipment, said system being designed to abate the escape of noise therefrom, and comprising:
    A. an enclosed combustion chamber having
       1. an open output end designed to be coupled to the aforesaid equipment,
       2. an opening for receiving combustion air,
       3. an outer shell, and
       4. a first acoustic attenuator mounted within and spaced from said outer shell and constructed to exhibit sound absorbing properties for noise generated within said combustion system, and including
          a. a grill of high-temperature material for resisting the high temperatures of combustion and having
             i. a substantially tubular shape,
             ii. a plurality of apertures spaced throughout and sized to absorb noise energy within a selected frequency range, and
             iii. said grill acting to transfer heat to the combustion air supplied to said combustion chamber to preheat said air and increase the combustion rate of the fuel,
    B. a fuel burner mounted adjacent to said combustion chamber to direct its flame thereinto.
    C. first means for ducting air to said combustion chamber, and means being enclosed and having
       1. an upstream end for admitting air and
       2. a downstream end,
       3. said downstream end terminating at said opening in said combustion chamber,
    D. a second acoustic attenuator connected to said air ducting means to be in airflow communication therewith, said attenuator having
       1. at least one passageway formed therein for the flow of combustion air therethrough, and
       2. means for absorbing sound positioned adjacent said passageway to attenuate the noise flowing out of said combustion system through said air ducting means and attenuator passageway.

11. A combustion system as claimed in claim 10, wherein said second acoustic attenuator further comprises:
    A. a plurality of partitions mounted therein to define a plurality of passageways for the flow of combustion air therethrough, each of said partitions being formed hollow and having
       1. at least one surface adjacent one of said passageways,
    B. said sound absorbing means including
       1. a plurality of holes formed in each of said surfaces to admit noise energy into the interior of said partition, and 2. a sound absorbing material substantially filling each of said partitions.

12. A combustion system as claimed in claim 11, wherein:
A. said plurality of holes are varied in size.

13. A combustion system as claimed in claim 12, comprising:
A. second means for ducting air,
B. said second air ducting means being enclosed and connected at one end to said first air ducting means downstream of said second acoustic attenuator, and being connected at its opposite end to said fuel burner.

14. A combustion system as claimed in claim 13, further comprising:
A. air compressing means positioned in said second air ducting means for supplying compressed air to said fuel burner to atomize the fuel prior to combustion.

15. A combustion system as claimed in claim 14, wherein:
A. at least a part of said first and second air ducting means incorporates means for relieving the pressure generated by an explosion.

16. A combustion system as claimed in claim 10, further comprising:
A. a reflector connected upstream of said second acoustic attenuator for reflecting noise which escapes said attenuator back through said attenuator where it can be further attenuated.

17. A combustion system as claimed in claim 16, further comprising:
A. an intake hood positioned at the upstream end of said first air ducting means,
B. said intake hood connected to the inlet of said second acoustic attenuator and containing said reflector.

18. A combustion system as claimed in claim 17, wherein:
A. said reflector comprises the front plane surface of said intake hood.

19. A combustion system as claimed in claim 17, wherein said reflector comprises:
A. a plurality of vanes mounted in said intake hood,
B. each vane having a concave inner surface which faces the inlet of said attenuator.

20. A combined recuperative combustion chamber and noise attenuator comprising:
A. a substantially enclosed outer tubular shell,
B. a grill supported within the interior of said outer shell, said grill having a substantially tubular shape, and
  1. a plurality of holes spaced therein and sized to absorb noise energy within a selected frequency range whereby said outer shell and grill function as a Helmholtz chamber to absorb noise energy within said combustion chamber,
C. a fuel burner having a front end mounted adjacent to said outer tubular shell and means surrounding said front end to eliminate a direct straight line acoustical path between said front end and said outer tubular shell, said fuel burner being adapted to direct its flame into said grill.

21. Apparatus as claimed in claim 20, wherein:

A. said grill is made of a high temperature material which resists the high temperatures of combustion which takes place within its interior, and
B. said grill is positioned to transfer heat to combustion air admitted into said combustion chamber thereby to preheat said air and increase the combustion rate of the fuel which is burned within said combustion chamber.

22. Apparatus as claimed in claim 21, wherein said grill is formed of:
A. a plurality of arcuate longitudinal sections,
B. each section having a lengthwise edge which overlaps the lengthwise edge of an adjacent section to form an articulated grill construction permitting thermal expansion of said grill.

23. Apparatus as claimed in claim 22, further comprising:
A. means for mounting said grill within said outer shell such that said grill is spaced from said outer shell substantially throughout its length to provide an annular space between the grill and shell.

24. Apparatus as claimed in claim 23, further comprising:
A. a first opening formed in said outer shell for admitting combustion air into said combustion chamber such that said combustion air flows through said annular space and into the interior of said grill through said plurality of holes.

25. Apparatus as claimed in claim 24, wherein said mounting means mounts said grill eccentrically within said outer tubular shell such that the space on the side of the grill adjacent said opening is greater than the space around the remainder of said grill.

26. Apparatus as claimed in claim 25, wherein:
A. said tubular shell has a forward end and an aft end, and said apparatus further comprises:
B. a damper mounted between said grill and said outer shell to control the flow of combustion air between said first opening and said fuel burner.

27. Apparatus as claimed in claim 26, wherein:
A. the aft end of said grill is closed, and
B. said damper is positioned adjacent to the aft end of said grill to control the amount of air which flows around the aft end of the grill to said fuel burner.

28. Apparatus as claimed in claim 27, wherein:
A. said damper is adjustable, said apparatus further comprising:
B. at least one movable rod attached to said damper, said rod extending outside of said tubular shell to permit adjustment of the damper.

29. Apparatus as claimed in claim 28, wherein said damper comprises:
A. an annular metal band adjustable coaxially of said grill to control the size of the opening around the aft end of the grill.

30. Apparatus as claimed in claim 27, further comprising:
A. a substantially cylindrical ignition tile, said tile including
  1. a forward opening,
  2. an aft opening,
  3. said aft opening positioned adjacent said fuel burner and said forward opening terminating within said tubular grill.

31. Apparatus as claimed in claim 30, further comprising:

A. a layer of insulation attached to the interior of said outer tubular shell.

32. Apparatus as claimed in claim 31, wherein said tubular shell and said tubular grill are both of substantially cylindrical shape.

33. Apparatus as claimed in claim 32, further comprising:
   A. a second opening formed at the forward end of said outer tubular shell for discharging hot combustion gases, and
   B. an external flange formed on the outer periphery of said outer shell adjacent said second opening for mounting said combustion chamber onto furnaces, driers, and like equipment.

34. Apparatus as claimed in claim 20, wherein:
   A. said tubular shell has a forward end and an aft end, said apparatus further comprises:
   B. a damper mounted between said grill and said outer shell to control the flow of combustion air between said first opening and said fuel burner.

35. Apparatus as claimed in claim 34, wherein:
   A. the aft end of said grill is closed, and
   B. said damper is positioned adjacent to the aft end of said grill to control the amount of air which flows around the aft end of the grill to said fuel burner.

36. Apparatus as claimed in claim 35, wherein:
   A. said damper is adjustable, said apparatus further comprising:
   B. at least one movable rod attached to said damper, said rod extending outside of said tubular shell to permit adjustment of the damper.

37. Apparatus as claimed in claim 36, wherein said damper comprises:
   A. an annular metal band adjustable coaxially of said grill to control the size of the opening around the aft end of the grill.

38. Apparatus as claimed in claim 20 wherein:
   A. said plurality of holes are of a uniform size and are spaced throughout said grill.

39. Apparatus as claimed in claim 20, wherein:
   A. said plurality of holes vary in size and are spaced throughout said grill.

40. Apparatus as claimed in claim 39, wherein:
   A. said plurality of holes are grouped into a plurality of cylindrical bands on said grill,
   B. the size of the holes in each band being different from the size of the holes in the remaining bands.

41. Apparatus as claimed in claim 23, wherein:
   A. said plurality of holes are of a uniform size and are spaced throughout each arcuate section.

42. Apparatus as claimed in claim 23, wherein:
   A. said plurality of holes vary in size and are spaced throughout each arcuate section.

43. Apparatus as claimed in claim 42, wherein:
   A. said plurality of holes are grouped into a plurality of cylindrical bands on each section,
   B. the size of the holes in each band being different from the size of the holes in the remaining bands.

44. A combustion system for use with furnaces, driers, and like equipment, said system being designed to abate the escape of noise therefrom, and comprising:
   A. an enclosed combustion chamber having
      1. an open output end designed to be coupled to the aforesaid equipment,
      2. an opening for receiving combustion air,
      3. an outer shell, and
      4. a first acoustic attenuator mounted within and spaced from said outer shell and constructed to exhibit sound absorbing properties for noise generated within said combustion system, and including
         a. a grill of high-tempearture material for resisting the high temperatures of combustion and having
            i. a substantially tubular shape,
            ii. a plurality of apertures spaced throughout and sized to absorb noise energy within a selected frequency range,
            iii. said grill acting to transfer heat to the combustion air supplied to said combustion chamber to preheat said air and increase the combustion rate of the fuel,
   B. a fuel burner mounted adjacent to said combustion chamber to direct its flame thereinto,
   C. first means for ducting air to said combustion chamber, said means being enclosed and having
      1. an upstream end for admitting air and
      2. a downstream end,
      3. said downstream end terminating at said opening in said combustion chamber,
   D. a damper positioned within said combustion chamber between said opening and said fuel burner to control the flow of combustion air within said combustion chamber,
   E. second means for ducting air, the second air ducting means being enclosed and connected at one end to said first means for ducting air and being connected at its opposite end to said fuel burner.

45. A combustion system as claimed in claim 44, further comprising:
   A. air compressing means positioned in said second air ducting means for supplying compressed air to said fuel burner to atomize the fuel prior to combustion.

46. A combustion system as claimed in claim 45, wherein:
   A. at least a part of said first and second air ducting means incorporates means for relieving the pressure generated by an explosion.

47. A combustion system as claimed in claim 45, further comprising:
   A. a second damper positioned in said first air ducting means, said second damper defining a flowpath for the combustion air which is supplied through said first air ducting means into said combustion chamber, and including
      1. a plurality of louvers disposed across said flowpath, and
      2. means for moving said louvers to permit modulation of the flow of combustion air through said first air ducting means into said combustion chamber thereby to control the air/fuel ratio in the combustion chamber.

48. A combustion system for use with furnaces, driers, and like equipment, said system being designed to abate the escape of noise therefrom, and comprising:
   A. an enclosed combustion chamber having
      1. an open output end designed to be coupled to the aforesaid equipment,
      2. An opening for receiving combustion air, 3. an outer shell, and
4. a first acoustic attenuator mounted within and spaced from said outer shell and constructed to exhibit sound absorbing properties for noise generated within said combustion system, and including
   a. a grill of high-temperature material for resisting the high temperatures of combustion and having
      i. a substantially tubular shape,
      ii. a plurality of apertures spaced throughout and sized to absorb noise energy within a selected frequency range
      iii. said grill acting to transfer heat to the combustion air supplied to said combustion chamber to preheat said air and increase the combustion rate of the fuel,
B. a fuel burner mounted adjacent to said combustion chamber to direct its flame thereinto,
C. first means for ducting air to said combustion chamber, said means being enclosed and having
   1. an upsteram end for admitting air and
   2. a downstream end,
   3. said downstream end terminating at said opening in said combustion chamber,
D. a damper positioned within said combustion chamber between said opening and said fuel burner to control the flow of combustion air within said combustion chamber,
E. a reflector connected at the upstream end of said first air ducting means for reflecting noise back into the interior of the combustion system.

49. A combustion system as claimed in claim 48, further comprising:
A. an intake hood positioned at the upstream end of said first air ducting means,
B. said intake hood including said reflector.

50. A combustion system as claimed in claim 49, wherein:
A. said reflector is formed as a front plane surface of said intake hood.

51. A combustion system as claimed in claim 49, wherein said reflector comprises:
A. a plurality of vanes mounted in said intake hood,
B. each vane having a concave inner surface which faces the downstream end of said first air ducting means.

* * * * *

UNITED STATES PATENT OFFICE
CERTIFICATE OF CORRECTION

Patent No. 3,840,326　　　　　　　　Dated October 8, 1974

Inventor(s) Robert E. Schreter

It is certified that error appears in the above-identified patent and that said Letters Patent are hereby corrected as shown below:

Claim 4, line 51, "grill" should be --inner shell--.

Claim 10, line 41, "and" (first occurrence) should be --said--.

Signed and sealed this 21st day of January 1975.

(SEAL)
Attest:

McCOY M. GIBSON JR.　　　　　　　　C. MARSHALL DANN
Attesting Officer　　　　　　　　　Commissioner of Patents